2 Sheets—Sheet 1.

A. CANFIELD.

CORN-CULTIVATOR.

No. 7,513. Reissued Feb. 20, 1877.

Witnesses:

Chas. Tupper,
P. R. Richards.

Inventor:

Andrew Canfield,
By W. P. Richards,
Atty.

N. PETERS, PHOTO-LITHOGRAPHER, WASHINGTON, D. C.

2 Sheets—Sheet 2.

A. CANFIELD.

CORN-CULTIVATOR.

No. 7,513. Reissued Feb. 20; 1877.

Witnesses:

Chas. Tupper.
P. R. Richards.

Inventor:

Andrew Canfield,
By W. B. Richards,
Atty.

N. PETERS, PHOTO-LITHOGRAPHER WASHINGTON, D. C.

UNITED STATES PATENT OFFICE.

ANDREW CANFIELD, OF DAVENPORT, IOWA.

IMPROVEMENT IN CORN-CULTIVATORS.

Specification forming part of Letters Patent No. 155,419, dated September 29, 1874; reissue No. 7,513, dated February 20, 1877; application filed January 16, 1877.

*To all whom it may concern:*

Be it known that I, ANDREW CANFIELD, of Davenport, Iowa, and formerly of Garnett, Kansas, have invented certain new and useful Improvements in Cultivators, which improvements are fully set forth in the following specification and drawings hereto annexed.

Figure 1:
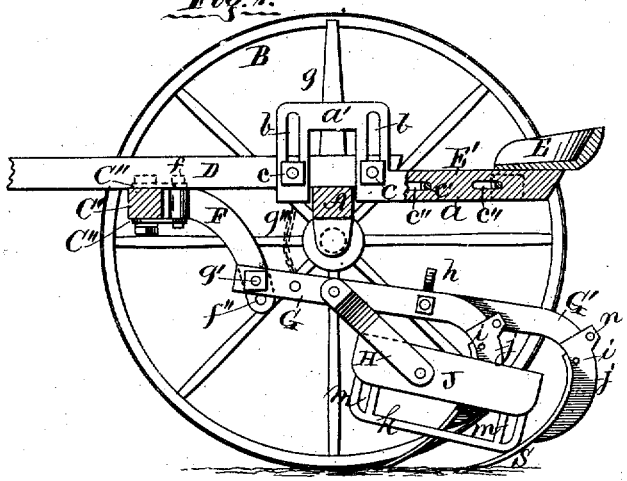
Figure 2:
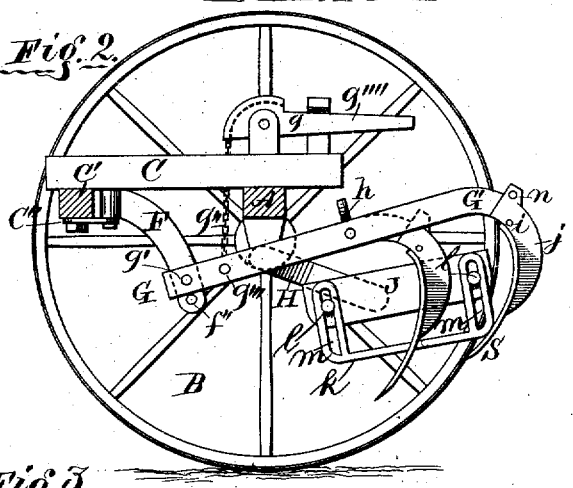
Figure 3:
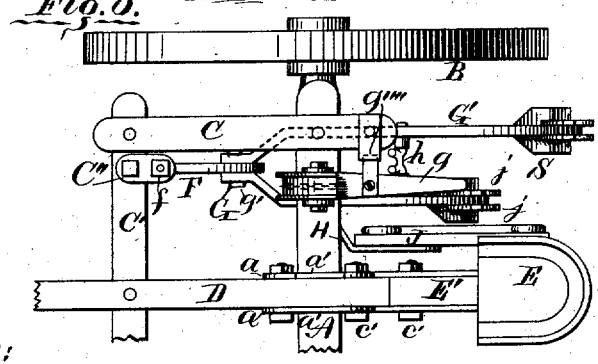
Figure 4:
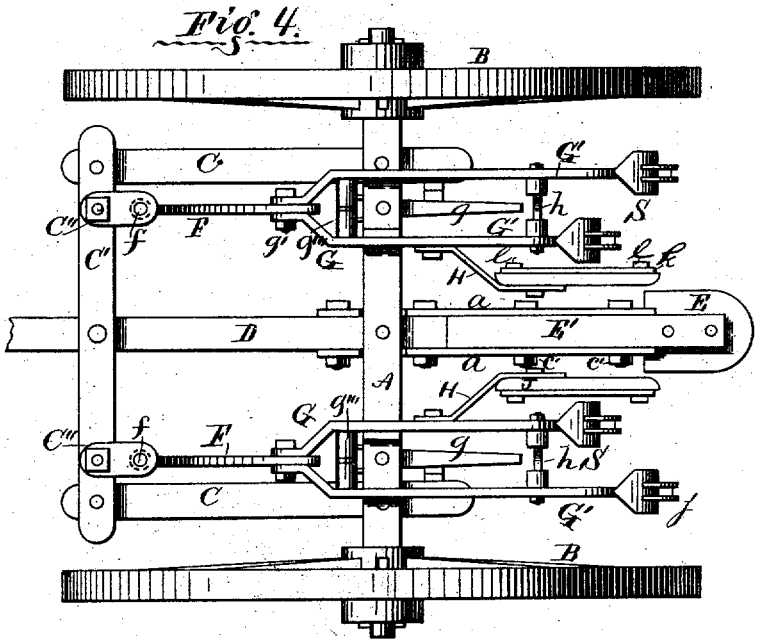
Figure 6:
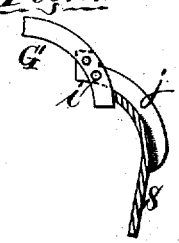
Figure 5:
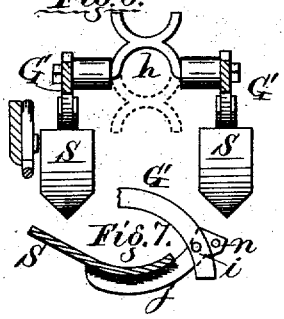
Figure 8:
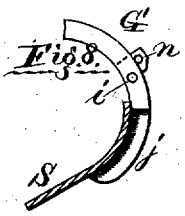

In the accompanying drawings, illustrating a machine embodying my invention, Figure 1, Sheet 1, is a sectional view in the line *x x* in Fig. 3. Fig. 2 is a side elevation, partly in section. Fig. 3 is a top-plan view, partly broken away. Fig. 4, Sheet 2, is a plan view, looking upward. Fig. 5 is a transverse section through one pair of plow-beams. Figs. 6, 7, and 8 are detail views, hereinafter referred to.

The invention relates to improvements in wheel-cultivators of that class adapted to cultivate both sides of a row of growing plants at the same time; and the invention consists in connecting the plow-beams to the frame of the implement by means of bars, hinged at their upper ends to the main frame, so as to permit of free lateral oscillation of their rear ends, while they are held firmly from other movements, and their main portions extending rearward and curved downward, and provided with bolt-holes for the adjustment of the plow-beams, which are hinged thereto, so as to permit of free vertical movement of said plows, but no other. It also consists in adjusting the driver's seat vertically by means of slotted arched supporting-plates; and, further, so constructing said plates, and attaching the seat-supporting bar thereto, that the seat may be adjusted to and from the axle.

The invention further consists in the use of adjustable stirrup-braces, in combination with the adjustable seat.

Referring to the details of the drawings by reference-letters, A represents the axle, supported on wheels B B. C C represent two bars, secured rigidly at their rear ends to the axle A, and, extending forward, are connected by a bar, C′. D is the draft-pole, mounted and secured rigidly midlength of and on the axle A and bar C′. E is the driver's seat, mounted on the rear end of a supporting-bar, E′, which is adjustably secured in position by means of plates *a a*, the front portions of which plates are arched over the axle, as shown at *a′ a′*, and vertically slotted, as shown at *b b*. Bolts *c c* are passed through the slots *b* and through the draft-pole D, and provided with nuts on their ends, by loosening which the seat E may be raised or depressed. The rear straight portion of the irons *a* are applied to the sides of the seat-bar E′, and are secured thereto by means of bolts *c′ c′*, which are passed through the longitudinally-oblong slots *c″*, so that by loosening the nuts on bolts *c′* the seat and its bar E′ can be adjusted backward or forward, as required, to balance the machine for drivers of different weight, so as to prevent neck-draft on the necks of the draft-animals.

C″ C″ are plates bolted to, and projecting in rear of, the bar C′, and carrying between their rear ends a vertical bolt, *f*. F F are the draft-plates, the upper horizontal ends of which have vertical holes, which receive the bolts *f*, and are pivoted thereto, so as to permit of free lateral oscillation of the bars F, but prevent other movements thereof. The bars F extend backward and are curved downward, as shown in the drawings, and are pierced with holes *f″*.

The plow-beams are connected in pairs, each pair consisting of a beam, G G′, their forward ends, G, embracing the lower ends of a draft-bar, F, to which they are pivoted by a bolt, *g′*, so as to have vertical oscillation thereon and be held upright. The plow-beams diverge rapidly at their forward ends, and, extending back parallel with each other, are curved downward at their rear ends, G′, for the reception of the shovels. The beams are raised and lowered by means of a hand-lever, *g*, on the axle A, from segments on the forward ends of which chains or cords *g″* extend to, and connect with, beam cross-stays *g‴*. The plows may be suspended clear of the ground by engaging the levers *g* with catches *g⁗*.

In rear of the stays *g‴* are stirrup-braces *h*, adapted to receive the feet of the driver when he is in his seat E, and by means of which he may move the beams laterally, and, if desired, vertically, also. Each stirrup-brace is secured to its beams by means of nuts, by loosening which the stirrups can be turned up for use, with the driver's seat in an elevated position, as shown more plainly by full lines at Fig. 5, or turned down for use, with the seat in a depressed position, as shown by dotted lines at same figure.

The shovels S are rigidly secured to curved shanks *j j*, which are connected by pivot-bolts *i* to the beams G′; and in rear of and above the pivots *i* wooden pins *n* are inserted through the rearwardly-projecting parts of the shanks *j*, so as to bear against the rear edges of the shovel-beams G′, as shown at Fig. 8, and resist all ordinary strain on the shovels when the machine is moved forward; but in the event of an undue strain occurring, the pin *n* will break, and allow the shovels to give back, as shown at Fig. 6. In backing the machine, the shovels may give forward without breaking the pin *n*, as shown at Fig. 7.

On the inner side of each pair of shovel-beams a curved arm, H, is rigidly secured, to the rear end of which a guard, J, is attached; and to each guard a runner, *k*, is applied by means of set-screws *l l*, which are passed through oblong loops *m m*, formed on the upper front and rear ends of the runners. By loosening the screws *l l* the runners can be so adjusted as to raise or depress the guard, and thus adapt it to plants of different sizes.

Having thus described my invention, what I claim as new, and desire to secure by Letters Patent, is—

1. The pendent bars F, curved as described, and arranged to operate with the plates C″, carrying the bolt *f*, bar C′, and having the holes *f*″, for the adjustment of the beams G G′, substantially as described, and for the purpose specified.

2. The vertically-adjustable arched irons *a a*, in combination with the tongue D and seat-beam E′, substantially as and for the purpose specified.

3. The arched plates *a*, secured to the tongue, as described, and having slots *c*″, combined with the bar E′ and bolts *c*′, substantially as and for the purpose specified.

4. The reversible foot or stirrup braces, combined with the shovel-beams, substantially as and for the purpose specified.

In testimony that I claim the foregoing as my invention I have hereto affixed my signature in presence of two witnesses.

ANDREW CANFIELD.

Witnesses:
GEORGE CURKENDALL,
HERMAN WITTENBERG.